Jan. 30, 1968          R. S. FOBES          3,366,278
DISPENSER FOR LIQUID BIOLOGICALS
Filed Dec. 3, 1965
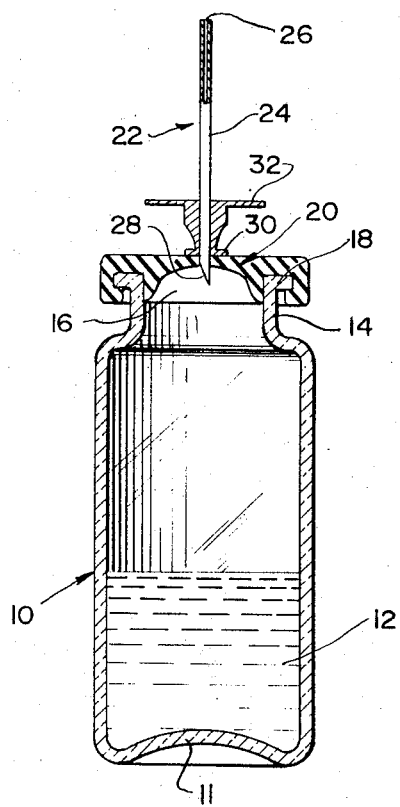
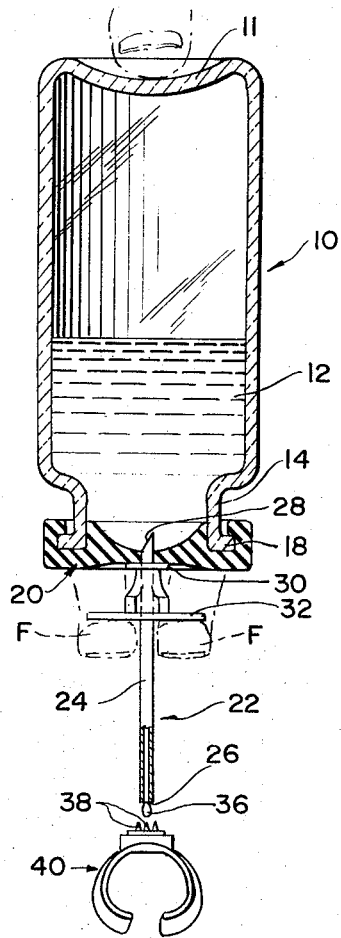
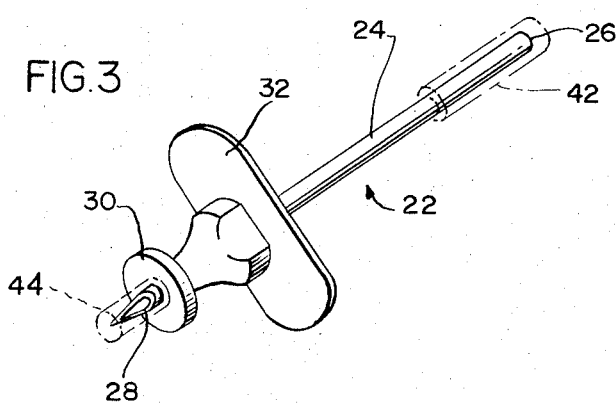
INVENTOR
ROBERT S. FOBES
BY *Bair, Freeman & Molinare*
ATTORNEYS

United States Patent Office 3,366,278
Patented Jan. 30, 1968

3,366,278
DISPENSER FOR LIQUID BIOLOGICALS
Robert S. Fobes, Alexandria, La., assignor to Lincoln Laboratories, Inc., Decatur, Ill., a corporation of Indiana
Filed Dec. 3, 1965, Ser. No. 511,499
2 Claims. (Cl. 222—82)

This invention relates to a dispenser of liquid biological, and more particularly relates to a device for effecting selectively controlled dispensing of very small amounts of liquid biological.

In the intradermal inoculation of persons with multiple pressure-punctures, highly satisfactory multiple-point pressure scarifiers have been devised, as for example disclosed in U.S. Patent 3,062,212. Such multiple point scarifiers provide a very close clustering of the scarifier points, as disclosed in U.S. Patent 3,136,314, in those usages where it is desired to load onto the scarifier points the liquid biological that is to be administered, and to retain such biological on the points by surface tension forces that are developed. When the points are closely clustered and the liquid biological is to be carried by the points prior to inoculation, the amount, or dosage, of biological required to be deposited on the points is very small. For example, with nine points clustered in a square dimension of restricted size, so that the spacing of the tips of adjacent pairs is about 0.08 to 0.12 cm., no more than about 0.01 ml. of liquid is required.

The loading of such a very small amount of liquid precisely upon such a close cluster of points raises a number of problems in the providing of a suitable dispenser which will dispense only precise small amounts of liquid biological, and which will prevent wasteful dispensing of excessive amounts of liquid biological. Aside from this obvious economic problem that exists when a costly biological is wastefully dispensed, an excessive dispensing of biological liquid may result in an uncontrolled broadcast of a biological substance that may lead to a dangerous condition.

While it has heretofore been proposed to effect accurately controlled dispensing of biological substances in liquid form from a syringe that has a minutely-bored tubular discharger thereon, it has been observed in practice that such an apparatus provides difficulty in expressing only a fraction of a drop of liquid from such a device because of the large mechanical advantage derivable from such syringe-type mechanisms. Furthermore, such a syringe-type dispenser is normally much too long in its overall size, resulting in that fingers which control the actuation of the plunger are required to be spaced a considerable distance from the discharge tip of the syringe and hence are unable to accurately "feel" the dispensing of very small amounts of liquid in the order of no more than about 0.01 ml. A further objection is the relatively high cost of such a dispenser.

It is proposed by this invention to provide a dispenser that is easily adaptable to and connected to existing consructions of containers for liquid biologicals, recognizing that present packaging of liquid biologicals normally involves a glass container with a closure or stopper therefor formed of rubber, or other pierceable and resilient material.

Thus, one object of this invention is to provide an improved liquid dispenser for effecting accurate manual control of the dispensing of very small amounts of a biological liquid.

Another object of this invention is to provide an improved liquid dispenser that avoids all the said deficiencies of existing dispensers and which is particularly characterized by its simplicity and inexpensiveness of construction, and by its effectiveness in operation.

2

A further object of this invention is to provide a dispenser for effecting controlled dispensing of small amounts of liquid biological, and which is readily connected to a rubber-stoppered container for such liquid biologicals.

Further objects and advantages of this invention will become apparent as the following description proceeds and the features of novelty which characterize this invention will be pointed out with particularity in the claims annexed to and forming a part of this specification.

A preferred embodiment of the invention is shown in the accompanying drawings, in which:

FIG. 1 illustrates in vertical cross-sectional views a typical rubber stoppered container for liquid biological to which is attached an improved dispenser embodying this invention.

FIG. 2 illustrates a typical use of the invention heredisclosed.

FIG. 3 is a perspective view of the dispenser device.

Referring now to the drawings there is shown in FIG. 1 container means that consists of a stoppered, or normally airtight, container 10, of glass or the like, having an amount of liquid biological 12 therein. The container 10 is provided with a constricted neck 14 and a mouth generally indicated at 16 that is surrounded by a radially enlarged lip, or flange, 18. A pierceable stopper 20, of rubber or the like is positioned in the mouth 16, and the stopper 20 provides a radially enlarged portion that abuts lip 18. This construction is a typical one for the packaging of liquid biologicals. Further, it is known to package the liquid biological 12 in the container 10 under reduced atmosph:ric pressure or in the presence of a sterile gas which is non-reactive to the ingredients of the liquid biological 12. It is known to provide a stoppered container 10 with dried biological therein for extended shelf life, and then when used the stopper 20 may be pierced or removed to permit entry of a reconstituting liquid into container 10 for causing the dried biological to go into solution to then provide a liquid biological ready for use.

FIG. 1 also shows the improved dispenser of this invention mounted on the container means. The improved dispenser is designated generally at 22 and includes an elongated tubular element 24 that defines a depensing tip 26 at one end and an entry, or piercing, tip 28 at the other end which is adapted for communication with the liquid biological 12 in the container means 10. The dispenser 22 is constructed to dispense a relatively small amount of the liquid biological from the relatively large supply thereof shown at 12 in the container means 10. The dispensing tip 26 is preferably squared off as shown, although another shape may be provided if desired; and the piercing tip 28 is preferably bevelled or sharpened. The elongated tubular element 24 also carries a pumping means thereon for effecting manually controlled pressurizing of the liquid 12 in the container 10, so as to effect a controlled dispensing of a relatively small amount of the liquid biological in the manner as illustrated in FIG. 2.

More specifically, the pumping means carried by tubular element 24 includes an annular abutment member 30 that is arranged for engagement with the outer face of the flexible rubber stopper 20. The abutment plate 30 is positioned on tubular element 24 in relatively close relation to the entry tip 28 of the tubular element 24, so that the engagement of the abutment plate 30 with the rubber stopper 20 operates to limit the length of the section of the tubular element 24 that will pass through the thickness or wall of the pierceable rubber stopper 20. The parts are arranged as best seen in FIG. 1 so that when the abutment plate 30 engages the rubber stopper 20, then the entry tip 28 of the tubular element 24 just enters into the well space that is immediately adjacent the inner surface of stopper 20 and which is defined by the neck 14 of container 10 and by the rubber stopper 20. This factor coupled with the bevelled shape of entry tip 28 insures that when the container 10 is in the inverted position as seen in FIG. 2, there may be effected substantially full drainage of all contents of biological 12 from the container 10.

The size of the abutment plate 30 is such that it is smaller than the inner dimension of the neck 14 of the container 10 so that pressure by the abutment plate 30 against rubber stopper 20 is always operative to effect a flexing or distortion of rubber stopper 20 to force same inwardly of the container 10. There is also provided on the tubular element 24, spaced axially thereof and between the dispensing tip 26 and the abutment plate 30, finger-engaging means in the form of an enlarged flange, or finger bridge, 32 which extends diametrically of the tubular element 24 and which is adapted for engagement by two fingers F which bridge the tubular element 24 as is illustrated in FIG. 2.

The dispenser 22 is preferably made of a sterilizable rigid material such as stainless steel, or a rigid plastic material that may be molded and which may be provided with sufficient sharpness at the entry tip 28 to effect piercing of the rubber stopper 20. The dispenser 22 is very simply connected to the said container means, consisting of container 10 and rubber stopper 20, by forcing the piercing tip 28 through the central portion of rubber stopper 20 whereupon the device is ready for use as seen in FIG. 2.

The use of the device will be understood from the foregoing description and with particular reference being made to FIG. 2 in explanation of the operation. In FIG. 2 the container 10 is shown inverted, and the user grasps the container 10 so that the bottom wall 11 thereof is engaged by the thumb or the palm of the hand and with the first and second fingers bridging the elongated tubular element and engaging the finger bridge 32. The bore through tubular element 24 is a very small one and this provides that there exists sufficient capillary forces and surface tension force in liquid 12 to prevent the liquid 12 from running out through a tubular element 24 under mere force of gravity. However, when pressure from the fingers is exerted against the finger bridge 32 in the direction toward the container 10 the force against finger bridge 32 is transmitted to abutment plate 30 which operates to flex the rubber stopper 20 a small amount inwardly of the container 10 but sufficiently to pressurize the interior of container 10 and the liquid contents 12 therein. This direct pressure is operative to controlledly expel a very small amount of liquid through the dispensing tip 26 of the tubular element 24, as seen by drop 36 formed as seen in FIG. 2. It is found that the requirement of application of increasing pressure on finger bridge 32 to cause expressing of a drop 36 operates to provide a very excellent and fine control on the expulsion of liquid from the dispensing tip 26. As seen in FIG. 2, when the container 10 is inverted the liquid 12 flows into the necked portion of the container 10 which operates in part to define the well 34 in which the liquid is then positioned. FIG. 2 also shows the small drop 36 being expressed from the dispensing tip 26, and with the drop 36 aligned with the upstanding points 38 carried on a multiple point scarifier 40 of the type shown and described in U.S. Patent 3,062,212.

In the packaging of the dispenser 22 as a unit, FIG. 4 illustrates how protective sleeve type caps 42 and 44 may be provided which slip over the respective ends of a sterilized tubular element 24 so as to protect respectively the dispensing tip 26 and the sharpened piercing tip 28. Such sleeve-type caps may be made of rubber or the like and they are easily pulled off the tubular element 24 when the device is ready for use.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A device for selective controlled dispensing of a relatively small quantity of a liquid biological from a relatively large supply thereof comprising, in combination, rigid container means for the liquid biological defining a container mouth, a cap portion that is flexible and pierceable relative to the remainder of the container means positioned in the container mouth, an elongated tubular element defining a dispensing tip at one end and an entry tip at the other end for communication with the liquid biological in the container means, the entry tip of the tubular element being arranged to establish communication between said entry tip and the interior of the container means through said pierceable cap portion, and pumping means carried solely by said tubular element and spaced from said container so as to be freely movable relative to said container for effecting manually controlled pressurizing of the liquid in the container through flexing of said cap portion only to effect controlled dispensing of a relatively small amount of the liquid biological from the dispensing tip of the tubular element, the pumping means including an abutment on the tubular element of smaller dimension than the container mouth positioned to engage the flexible cap portion of the container means for selective pressing against said flexible cap portion to force same inwardly relative to the rigid container means, and finger-engaging means carried by said tubular element between said abutment and the dispensing tip.

2. A device as in claim 1 wherein the finger-engaging means is an elongated flange extending diametrically of the tubular element for engagement by two fingers which bridge the tubular element, and the size of said elongated flange being less than the width dimension of the container.

References Cited

UNITED STATES PATENTS

| | | | |
|---|---|---|---|
| 1,006,623 | 10/1911 | Barrett | 222—90 |
| 2,098,524 | 11/1937 | Smith | 222—83 |
| 2,554,352 | 5/1951 | Ward et al. | 222—88 |
| 2,571,504 | 10/1951 | Vuillemenot | 222—211 |
| 2,587,683 | 3/1952 | Barry | 222—89 |
| 2,642,064 | 6/1953 | Lawshe | 222—83 |
| 2,738,107 | 3/1956 | Graham | 222—211 |
| 3,126,004 | 3/1964 | Sarnoff | 222—81 |

WALTER SOBIN, *Primary Examiner.*